(12) United States Patent
Christopher et al.

(10) Patent No.: US 7,604,760 B2
(45) Date of Patent: Oct. 20, 2009

(54) AUTOMATIC PRESSURE AND TEMPERATURE CONTROL APPARATUS AND METHOD FOR CURING TIRE ASSEMBLIES

(75) Inventors: Norman Christopher, Fountain Inn, SC (US); Stephen Manuel, Flat Rock, NC (US); Robert Young, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/568,717

(22) PCT Filed: Aug. 13, 2004

(86) PCT No.: PCT/US2004/026308

§ 371 (c)(1),
(2), (4) Date: Dec. 8, 2008

(87) PCT Pub. No.: WO2006/022711

PCT Pub. Date: Mar. 2, 2006

(65) Prior Publication Data

US 2009/0211689 A1 Aug. 27, 2009

(51) Int. Cl.
*B29C 35/04* (2006.01)
*B29D 30/06* (2006.01)

(52) U.S. Cl. .................. 264/40.1; 264/297.5; 264/326; 425/29; 425/34.3; 425/40

(58) Field of Classification Search ................. 264/40.1, 264/297.5, 326, 501; 425/17, 29, 34.3, 40
See application file for complete search history.

(56) References Cited

U.S. PATENT DOCUMENTS

| 2,514,718 | A | 7/1950 | Oaks |
| 3,556,201 | A | 1/1971 | Sander |
| 4,861,253 | A | 8/1989 | Mattson |
| 6,267,084 | B1 | 7/2001 | Louchart, III |
| 2006/0012076 | A1* | 1/2006 | Caretta et al. ............... 264/326 |

FOREIGN PATENT DOCUMENTS

| GB | 1176668 A | 1/1970 |
| JP | 2002011722 A | 1/2002 |
| WO | WO 03 092988 A1 | 11/2003 |

OTHER PUBLICATIONS

Supplementary European Search Report for PCT/US2004/026308, May 28, 2008.
European Office Action of Sep. 3, 2008 for EP Application No. 04781054.4-2307.

* cited by examiner

*Primary Examiner*—James Mackey
(74) *Attorney, Agent, or Firm*—Dority & Manning, P.A.

(57) ABSTRACT

An automatic pressure and temperature control apparatus and method for use in curing tire assemblies including retread tire assemblies is provided. Using water as a heating medium, a new process control method and apparatus is described that allows a more precise control of process variables during steady state conditions such that heat transfer is improved and the undesirable formation of steam is eliminated. Existing processes and equipment for curing tire assemblies can be modified, using the teaching disclosed herein, to implement and achieve the benefits of the present invention.

25 Claims, 3 Drawing Sheets

AUTOMATIC PRESSURE AND TEMPERATURE CONTROL APPARATUS AND METHOD FOR CURING TIRE ASSEMBLIES

TECHNICAL FIELD OF THE INVENTION

The present invention relates to an automatic pressure and temperature control for an apparatus used for curing tire assemblies. Using water as a heating medium, the present invention utilizes a new process control method and apparatus that allows a more precise control of process variables during steady state conditions such that heat transfer is improved and the undesirable formation of steam is eliminated. Existing processes and equipment for curing tire assemblies can be modified, using the teaching disclosed herein, to implement and achieve the benefits of the present invention. While embodiments of the present invention will be described herein with regard to retread tire assembly operations, the scope of the present invention as set forth in the claims that follow includes other tire assembly applications.

BACKGROUND OF THE INVENTION

In tire retreading operations, the worn tread is stripped or buffed from the crown of the tire carcass and new tread rubber is bonded in place. In one type of operation, the new tread rubber is in a cured state when placed on the carcass and a bonding layer of, for example, gum rubber is placed between the crown of the carcass and the cured tread strip. The bonding layer is cured to secure the tread to the carcass. In one type of curing operation, the retread tire assembly is placed in an envelope that is then evacuated. The assembly and envelope are placed in a chamber for heat and pressure treatment to cure the bonding layer.

In another type of operation, the tread rubber is in AN uncured state and is applied to the carcass crown and cured in place. The assembly of carcass and uncured tread rubber is placed in a curing press having a bladder that fits within the interior cavity of the tire assembly and heating means to heat the bladder and the area surrounding the tire tread.

A curing chamber is a large pressure and temperature controlled vessel having a capacity for several tire assemblies. One type curing chamber for curing 25 tire assemblies has an interior volume of 905 cubic feet. Typically, to heat the air in a curing chamber, heated steam or oil is forced through a heat exchanger in the curing chamber, or electrical resistance elements in the curing chamber are used. Each of these has deficiencies.

Steam requires a steam boiler and associated piping and control elements that are expensive to install and maintain. A heated oil system is also expensive to install and maintain, and requires special care to prevent fire hazards. Both steam and heated oil depend on heat transfer to heat the air in the curing chamber. Electrical resistance heats the air directly, but is expensive to operate.

U.S. Pat. No. 6,267,084 (hereinafter "the '084 patent"), owned by Applicants' assignee and incorporated herein by reference for all purposes, describes an apparatus for curing retread tire assemblies that uses heated, pressurized water as the heating medium for a curing chamber. Such apparatus is less expensive to install and maintain than either a steam or oil system. The apparatus is less expensive to operate than electrical resistance heating elements. Furthermore, the heat transfer capacity needed for tire curing operations can be achieved using water as a heat transfer medium.

In one embodiment described in the '084 patent, the apparatus includes a curing chamber having an interior space in which retread tire assemblies may be placed for curing. The curing chamber has a heat exchanger in the interior space. An electric or gas powered vessel to heat water is connected in a closed circuit to the heat exchanger. The air in the curing chamber is circulated by a fan to ensure uniformity of the air temperature throughout the chamber and to facilitate heat transfer from the heat exchanger. The vessel has the capacity to heat water to at least 290° F. (143° C.). The vessel preferably has a volumetric capacity of approximately 20 gallons of water. A pump, preferably a centrifugal pump, is disposed in the closed circuit to pump heated water between the vessel and the heat exchanger under pressure. The pump provides a flow rate of 20 to 50 gallons per minute, and preferably about 25 to 35 gallons per minute. For this embodiment of the '084 patent, a control valve maintains a flow of heated water at a constant rate to the curing chamber to meet heating demand. A temperature sensor senses the temperature in the curing chamber, measuring the air temperature or the temperature at the retread tire assembly, and provides feedback to the control valve for controlling the flow of heated water.

When using water as the heating medium in a system such as that described in the '084 patent, if proper system pressure is not maintained throughout the curing process, water in the system will convert to steam, which can cause cavitations in the pump and subsequent mechanical failure. Furthermore, during startup, the system can undesirably exhaust steam if the system overpressures due to improper temperatures or water levels that may occur during startup. Providing an appropriate pressure is also particularly important because the water within the system must be maintained in its liquid state in order to achieve the desired heat transfer and heat capacity characteristics. Furthermore, if a higher pressure can be properly maintained, a higher overall water temperature can be used, which results in a faster heat transfer to the tires and thus a faster curing time. As such, it is particularly desirable to be able to operate close to the overall mechanical pressure limits of the system. Such operation requires more precise control of temperature and pressure. More specifically, variations of temperature and pressure about the desired setpoints of the system must be minimized or even eliminated.

Accordingly, as will now be described, the present invention provides an automatic pressure and temperature control apparatus that allows for improved operation and control in the use of water as a heat transfer medium for curing tire assemblies.

SUMMARY OF THE INVENTION

Objects and advantages of the invention will be set forth in part in the following description, or may be obvious from the description, or may be learned through practice of the invention. The present invention relates to an automatic pressure and temperature control method and apparatus for use in curing tire assemblies, including retread tire assemblies. Advantages in curing efficiency and manufacturing costs can be achieved using the present invention. Exemplary embodiments of the apparatus and method of the present invention will now be summarized.

On one exemplary embodiment, the present invention provides an apparatus for curing tires that includes a chamber configured for containing at least one tire assembly for curing. A heat exchanger is disposed with the chamber. A heating unit is provided for heating water and is in fluid communication with the heat exchanger as part of a closed circuit. The heating unit has a heating unit outlet for the discharge of heated water from the heating unit. A pump for circulating a flow of water between the heating unit and the heat exchanger is provided. The pump has a pump inlet for the flow of water into the pump. An expansion tank is connected so that it is in fluid communication with the heating unit outlet and the pump inlet such that water may circulate within the closed circuit from the heating unit, into the expansion tank, and back to the pump. A valve is connected in the closed circuit between the heating unit outlet and the expansion tank so as to control the flow of water fed to the expansion tank from the heating unit. A pressure sensor is positioned for measuring the pressure of the water in the closed circuit. A control system is provided that is in communication with the pressure sensor and the valve. The control system is configured for opening the valve when the pressure of water in the closed circuit falls below a desired set-point pressure and configured for closing the valve when the pressure of water in the closed circuit rises above the desired set-point pressure.

Various modifications and features may be made to the exemplary embodiment just described. For example, a temperature sensor may be added that is positioned for measuring the water temperature in the closed circuit at a predetermined position that is upstream of the pump and downstream from the heat exchanger. The control system may be placed in communication with the temperature sensor and the heating unit and be configured for operating the heating unit based on output from the temperature sensor. Various heat exchanger types may be used. For example, the heat exchanger may be a multi-pass fin and tube assembly or may be a steam plate assembly. The chamber may be provided in a variety of different applications as desired. For example, the chamber may be a curing chamber for curing a previously cured tread on a previously cured tire carcass. Alternatively, the chamber may be a tire curing press where the heat exchanger includes a bladder disposable in an interior of a tire cavity and a circuit for guiding the flow of water through portions of the curing press surrounding an exterior of the tire. Depending on the application, the water used in the closed circuit of this exemplary embodiment may be heated to a temperature of, for example, 155° C. However, other temperatures may be used as needed. Similarly, means may be provided for circulating air in the chamber at a rate of about 1500 to 1800 feet per minute; however, other flowrates may be applied. For this exemplary embodiment, the pump is rated to circulate heated water at a rate of about 25 to 35 gallons per minute. Other pumps with other flowrate capabilites may be used depending upon the application.

In another exemplary embodiment of the present invention, an apparatus for curing tires is provided that has a chamber configured for containing at least one tire assembly for curing. Also included is a heat exchanger that is in thermal communication with the chamber. For heating the water a heating unit is provided that is in fluid communication with the heat exchanger. A pump circulates a flow of water between the heating unit and the heat exchanger. An expansion tank is placed in fluid communication with the heating unit and the pump such that water may circulate from the heating unit to the expansion tank and the heat exchanger, and back to the pump. A pressure sensor is placed in fluid communication with the water. A valve is connected fluidly between the heating unit and the expansion tank. The valve is configured for selectively diverting at least part of the flow between the heating unit and the heat exchanger to the expansion tank based on pressure readings determined by the pressure sensor.

The present invention also provides a process for curing tire assemblies. One exemplary method of the present invention includes the steps of placing a plurality of tire assemblies in a chamber, heating water to a desired set-point temperature using a heating unit, circulating the heated water in a closed circuit through a heat exchanger in the chamber, circulating air in the chamber to flow by the heat exchanger, measuring the pressure of the heated water, comparing the measured pressure to a desired set-point pressure, opening a control valve to divert the water to an expansion tank if the measured pressure is below the desired set-point pressure, and closing the control valve to prevent water from flowing to the expansion tank if the measured pressure is above the desired set-point pressure. Various modifications and additions can be made to this method. For example, additional steps may include measuring the temperature of the heated water at a predetermined position that is after the water passes through the heat exchanger and before the water passes through the heating unit, then comparing the measured temperature to a desired set-point temperature and modifying the operation of the heating unit depending upon the results of said comparing step.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in this specification, which makes reference to the appended figures, in which.

Figure 1:
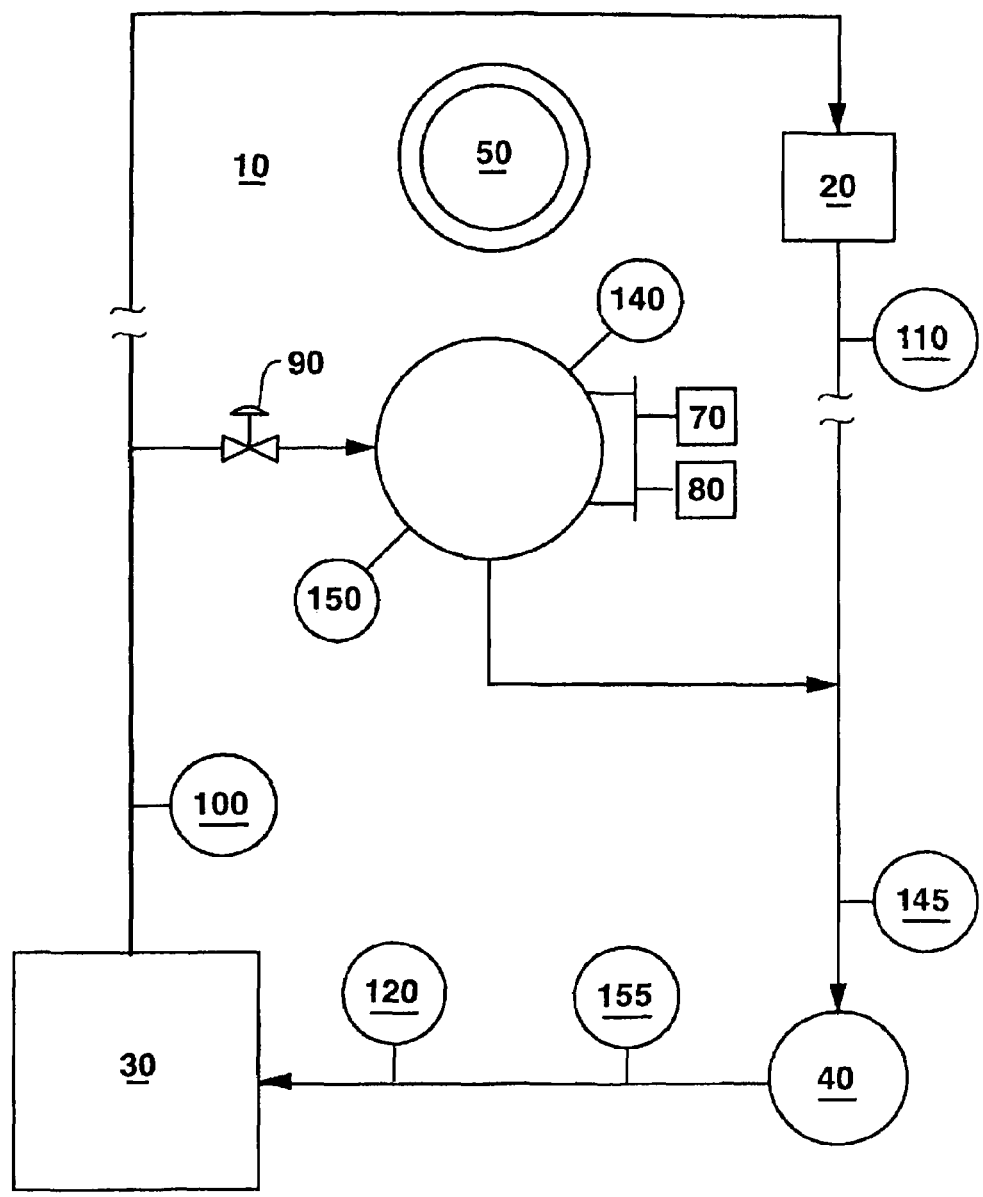
FIG. 1 is a schematic representation of an apparatus in accordance with an exemplary embodiment of the present invention.

Repeat use of reference characters in the present specification and drawings is intended to represent same or analogous features or elements of the invention.

DETAILED DESCRIPTION OF THE PREFERRED EMBODIMENTS

The present invention provides an automatic pressure and temperature control for an apparatus used for curing tire assemblies and particularly retread tire assemblies. Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

An exemplary embodiment of the present invention is depicted schematically in FIG. 1. A tire curing chamber 10 is provided, which is a large volume, heat and pressure controlled chamber for curing tire assemblies and particularly retread tire assemblies. A heat exchanger 20 is disposed in the curing chamber 10 to transfer heat to the air in chamber 10. As an example, a curing chamber and heat exchanger as described in the illustrative embodiment are available from Cure Tech Inc. of Conyers, Ga. In an operation to cure a precured tread to a carcass, the bonding rubber layer is heated to about 108° C. To obtain this temperature at the bonding rubber layer, the air in the chamber is heated to a range of about 90° C. to about 150° C. and preferably to about 120° C. to 130° C. The heat exchanger may be any suitable unit, and is preferably a tube and fin multi-pass type heat exchanger or a steam-plate type heat exchanger.

This exemplary embodiment of the present invention advantageously uses a heat exchanger 20 sized for steam heat in a conventional curing chamber, which does not require modifying the interior of the curing chamber to use the invention. As described in the '084 patent, it was previously determined that using conventional methods of sizing a heat exchanger for the curing chamber requirements and using hot water as the heat transfer medium, a heat exchanger about 5 to 7 times larger than the steam unit in a conventional curing chamber would be required. Such a heat exchanger would have taken far too much space in the curing chamber to be practical. By changing the flow characteristics of heated water through the heat exchanger, rather than the size of the heat exchanger, it was found that heat transfer meeting the demand in the curing chamber could be accomplished with heated water in a closed system.

Accordingly, the system illustrated schematically in FIG. 1 uses heated water that is pumped through heat exchanger 20 for the required heat transfer. A boiler or water heater 30 and heat exchanger 20 are connected in a closed system for circulating heated water therethrough with pump 40. For a single curing chamber 10, boiler 30 has a capacity of 20 gallons of water. Including heat exchanger 20, the total water volume of the described embodiment system is about 90 gallons of water. Boiler 30 includes a pressure container and multi-stage heating elements for efficient heating of the water responsive to demand. Boiler 30 is controlled to maintain the predetermined water temperature setting, and has a high temperature shutoff and includes pressure relief valves.

A Caloritech Inc. (Amherst, N.Y.) model VWBF-20 water boiler or a BUDZAR (Willoughby, Ohio) model 1WT-150-DSP water boiler are examples of a suitable boiler or water heater 30. By way of example only, suitable controllers for boiler 30 are available from Yokogawa, Allen Bradley, and Partlow. Pump 40 is preferably a centrifugal pump to move the heated water from boiler 30 through heat exchanger 20. Pump 40 operates at a constant flow in the range of 15 to 40 gallons per minute, and preferably about 25 to 35 gallons per minute, to move a sufficient quantity of heated water to meet the heating requirements of curing chamber 10. An R. S. Corcoran Co. (New Lenox, Ill.) Model 2000 D has been found to be a suitable pump 40.

Using a temperature difference (i.e. "delta") of about 17° C. (30° F.) from the heat exchanger 20 to the curing chamber air, during normal operation of chamber 10, boiler 30 heats water to a temperature in a range of 120° C. to about 190° C., and preferably about 170° C. to about 180° C.

Heated water in this closed system will reach a pressure of approximately 170 to 190 psi. The flow rate of the heated water is in a range of 15 to 40 gallons per minute and preferably about 25 to 35 gallons per minute. With this water temperature and flow rate, the air in the curing chamber will reach about 90° C. to about 150° C., which is desired for heating the tire assemblies 50 to reach a cure temperature in the bonding layer.

A forced air circulation system in curing chamber 10, for example, a fan (not shown), circulates air past heat exchanger 20 to facilitate heat transfer from the water to the air, and around the interior space to ensure uniformity of the temperature in curing chamber 10. Preferably, air circulation is at a rate of at least 1000 feet per minute, more preferably, in a range of 1500 to 1800 feet per minute.

An expansion tank 60 is provided in fluid communication with the discharge of boiler 30 and the intake of pump 40. For the exemplary embodiment being discussed, expansion tank 60 has a water volume of about 80 gallons. Two level switches 70 and 80 are provided with tank 60 to ensure that a proper water level is maintained. A make-up supply of water can also be provided. During operation of the system, a certain volume of air or other gas is present above the surface of the water in expansion tank 60. The pressure of this volume of air is directly affected by the temperature of the water in tank 60. A make-up supply of air can be provided to tank 60 as needed.

A control valve 90, such as an electrovalve, is placed between discharge of boiler 30 and expansion tank 60. Numerous different types of control valves may be used for control valve 90. By way of example only, control valve 90 may be a Spirax/Sparco (Blythewood, S.C.) model 1 "KE43/5223/EP5/MPC2" or other suitable control valve.

Control valve 90 is used to open or close the flow of water from the discharge of boiler 30 that is allowed to enter expansion tank 60. When fully closed, all heated water leaving boiler 30 is eventually fed through heat exchanger 20 where the temperature of the water drops as heat is exchanged with the air circulating within curing chamber 10 to heat tire assemblies 50. Thermocouple 100 measures the temperature of water exiting boiler 30 while thermocouple 110 measures the temperature of water between heat exchanger 20 and the intake of pump 40. Water returns from heat exchanger 20 to pump 40 and is fed to boiler 30. Thermocouple 120 provides for a measurement of the water temperature just before it enters boiler 30.

Without active intervention, through an automated control system for example, the overall pressure water in the system illustrated in FIG. 1 would vary with the average water temperature in the system and the air temperature in expansion tank 60. Unless this inevitable variation in pressure is actively controlled, the boiler 30 would have to be operated at a lower temperature than desired in order to avoid having the water turn into steam when the pressure in the system drops. Operating at a lower temperature is undesirable because it would increase the time necessary for curing the tires.

Accordingly, in order to maintain temperatures and pressures as closely as possible at the target values described above, the system is controlled primarily through regulation of control valve 90 and the firing of boiler 30 based on certain measurements at specific locations within the system. During operation, the pressure of the overall system is measured, for example, by pressure sensor 145, which is measuring the pressure of the water at the inlet to pump 40. While the pressure can be measured by sensors 140 and 155, the location of sensor 145 is preferred. When this pressure falls below the desired set-point or begins dropping below the desired set-point, a signal is sent to control valve 90 causing it to open. In turn, heated water from the discharge boiler 30 is then fed to expansion tank 60. As a result, the overall water temperature in expansion tank 60 will increase. This temperature change is measured by thermocouple 150. As heated water is added to expansion tank 60, the pressure measured by sensor 145 will also increase. Once the pressure in the system approaches or achieves the desired set-point, valve 90 is again closed. While the pressure measured by sensor 145 is at or above the desired set point, valve 90 will remain in the closed position. Using the teaching disclosed herein, one of ordinary skill in the art will appreciate that numerous techniques and equipment may be used to achieve the control sequence just described. By way of example only, a PLC may be used to monitor the pressure in the system, calculate how much time to open valve 90, and then operate valve 90 as required.

With pressure in the system stabilized at the desired target pressure, the water can be heated to higher temperatures as previously mentioned. Conventionally, a heating system would attempt to regulate the overall temperature of the water in the system by determining the heat energy added by boiler 30 based on the temperature of water measured at the outlet of boiler 30 using, for example, thermocouple 100. Because of the relatively slow reaction time of the boiler 30, such a control scheme allows a significant amount of water below the target temperature to flow through heat exchanger 20 before the desired temperature correction is achieved. In addition, a lower curing efficiency results and large temperature variations also occur.

Instead, to maintain a more constant temperature of water at or near the desired set-point, the temperature of the water is measured upstream of the boiler 30 input and downstream of exchanger 20. For example, for the system depicted schematically in FIG. 1, thermocouple 110 measures the water temperature at a predetermined location that is upstream of the input to boiler 30. Based on this temperature, the amount of flame modulation or heat input required by boiler 30 to return the water temperature to the set-point temperature is determined based on the capacity and efficiency of boiler 30. By then activating boiler 30 early enough, i.e. before cold water is already exiting boiler 30, the correct amount of flame modulation is applied so that heating begins to take place before the colder water gets to the boiler or at least before such colder water is discharged from boiler 30. As a result, water exiting boiler 30 is much closer to the desired set-point temperature than would be achieved by regulating the water temperature based on a measurement occurring between discharge of the boiler and heat exchanger 20. By way of example only, for the exemplary embodiment depicted in FIG. 1, applicants have determined that positioning thermocouple 110 at a position that is in a range of about 10 to 45 seconds upstream of boiler 30 provides sufficient lead time to activate boiler 30 and more precisely regulate the overall temperature of the water entering heat exchanger 20. Using the teachings disclosed herein, one of ordinary skill in the art will understand that different positions for the location of thermocouple 110 may be used or required depending upon the particular equipment and configurations of the present invention that may be applied. Furthermore, it will also be understood, using the teachings disclosed herein, that a variety of controllers and sensors may be used to implement the process control sequence described herein.

The invention provides a heated water system that is readily installed in conventional curing chambers. The system can also be integrated with the existing heat exchanger and temperature sensors. The invention advantageously is less expensive and less difficult to operate than steam or oil systems.

FIG. 1 describes the use of a curing chamber 10 where tire assemblies 50 are placed therein for curing. However, in alternative embodiments, the present invention can also be adapted for use with a curing press for a so-called "hot cure" retreading operation. In hot cure, the tread rubber placed on the buffed carcass is not cured, and the curing operation both cures the tread rubber and bonds it to the carcass. The retread tire assembly is placed in a curing press similar to those used for vulcanizing new tires. The curing press includes an internal cavity in which the retread tire assembly is placed. A mold tread ring surrounds and is pressed into the tread rubber to form the tread pattern. The ring is heated by a heat exchanger in the curing press to heat and cure the rubber. A bladder is disposed in the internal space defined by the tire and is inflated with a fluid to apply heat and pressure to the inner surface of the tire for shaping and curing. The system is constructed so as to provide heated water to the press heat exchanger and to the bladder. As with FIG. 1, a temperature sensor is placed downstream of the discharges of the heat exchanger and bladder and upstream of the boiler to'provide a temperature reading that is then utilized as previously described. The water pressure in the system may also be controlled as previously described.

Finally, it should be noted that the overall pressure in the system can also be regulated and controlled by adding or releasing air from expansion tank 60 based on measurements taken by pressure sensors 140, 145, or 155. A control valve may be added to an air supply connected to tank 60, and such valve could then be integrated with the system controller. However, this technique is a less preferred embodiment of the present invention for several reasons. For example, the release of air from the system is undesirable because heat energy is also released. Additionally, air contains oxygen which promotes rust and corrosion. Furthermore, applicants have found that the addition or removal of air to and from expansion tank 60 is not necessary because temperature and pressure within the system can be controlled using the exemplary embodiment of the present invention already described above.

Figure 2:
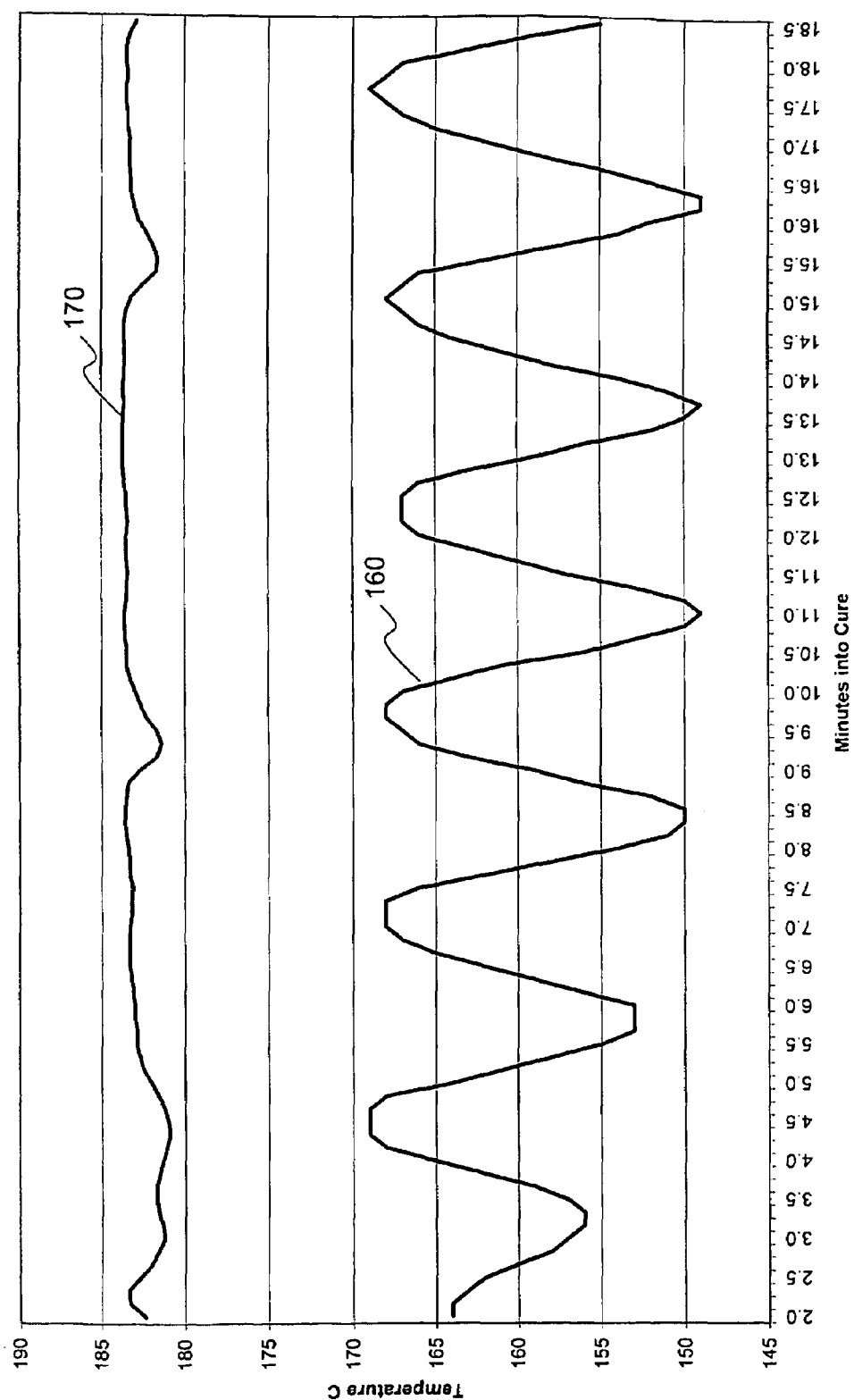
FIG. 2 is a plot of certain temperature data as will be described below.

FIG. 2 provides a plot of temperature data versus time. Temperature line 160, the bottom plot line of FIG. 2, depicts the temperature of water exiting the boiler of a system operating without the improvements of the present invention. Temperature line 170, the top plot line of FIG. 2, depicts the temperature of water exiting the boiler of a system operating with the improvements of the present invention. For the curing process represented by line 160, large temperature fluctuations are occurring during the curing process, which results in a decrease in the overall efficiency of the cure and thus an increase in the time to cure. It should also be noticed that due to these fluctuations, the overall average temperature of line 160 is also lower than the overall average temperature of line 170. In contrast, the process represented by temperature line 170 is much more stable and is able to operate at an overall higher temperature than the process represented by line 160.

Figure 3:
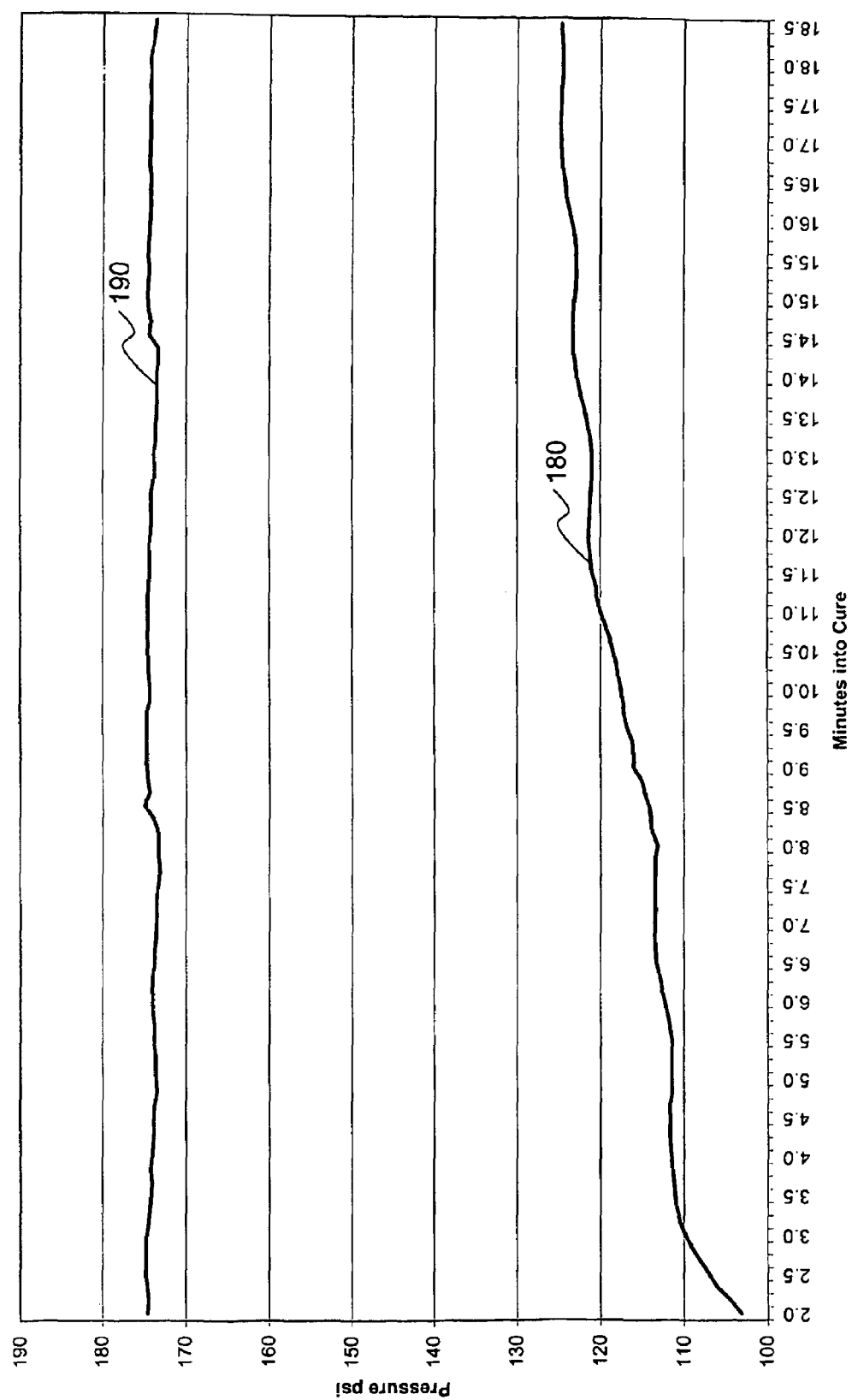
FIG. 3 is a plot of certain pressure data as will be described below.

Similarly, FIG. 3 provides a plot of pressure data versus time. Pressure line 180, the bottom plot line of FIG. 3, depicts the pressure of water exiting the boiler of a system operating without the improvements of the present invention. Pressure line 190, the top plot line of FIG. 3, depicts the pressure of water exiting the boiler of a system operating with the improvements of the present invention. For the curing process represented by line 180, there is an initial rapid increase in pressure at the start of the curing process that is followed by a steady increase in pressure during the cure. As a result, the maximum temperature at which the process represented by line 180 is lower at the beginning of the cure because of the decreased pressure, which means this process has a longer overall cure time than a process that can be operated at higher temperatures throughout the curing process. In contrast, the process represented by pressure line 190 is more stable and is able to operate at an overall higher pressure (and therefore higher temperature) throughout the curing process.

Using the teachings disclosed herein, variations can be used to tune or optimize the control system for the curing process described herein without departing from the scope and spirit of the claims that follow. It is intended that the invention include such modifications and variations as come within the scope of the following claims and their equivalents.

What is claimed is:

1. An apparatus for curing tires, comprising:
   a chamber configured for containing at least one tire assembly for curing;
   a heat exchanger disposed in said chamber;
   a heating unit for heating water, said heating unit being in fluid communication with said heat exchanger in a closed circuit, said heating unit having a heating unit outlet for the discharge of heated water from said heating unit;
   a pump for circulating a flow of water between said heating unit and said heat exchanger,
   said pump having a pump inlet for the flow of water into said pump;
   an expansion tank in fluid communication with said heating unit outlet and said pump inlet such that water may circulate within said closed circuit from said heating unit, into said expansion tank, and back to said pump;
   a valve connected in said closed circuit between said heating unit outlet and said expansion tank so as to control the flow of water fed to said expansion tank from said heating unit;
   a pressure sensor for measuring the pressure of the water in said closed circuit; and,
   a control system in communication with said pressure sensor and said valve, said control system configured for opening said valve when the pressure of water in said closed circuit falls below a desired set-point pressure and configured for closing said valve when the pressure of water in said closed circuit rises above the desired set-point pressure.

2. An apparatus for curing tires as set forth in claim 1, further comprising a temperature sensor positioned for measuring water temperature in said closed circuit at a predetermined position that is upstream of said pump and downstream from said heat exchanger.

3. An apparatus for curing tires as set forth in claim 2, wherein said control system is in communication with said temperature sensor and said heating unit and is configured for operating said heating unit based on output from said temperature sensor.

4. An apparatus for curing tires as set forth in claim 3, wherein said heat exchanger is a multi-pass fin and tube assembly.

5. An apparatus for curing tires as set forth in claim 1, wherein said heat exchanger is a steam plate assembly.

6. An apparatus for curing tires as set forth in claim 1, wherein said chamber is a tire curing press and said heat exchanger further comprises a bladder disposable in an interior of a tire cavity and a circuit for guiding the flow of water through portions of said curing press surrounding an exterior of the tire.

7. An apparatus for curing tires as set forth in claim 1, further comprising means for circulating air in said chamber at a rate of about 1500 to 1800 feet per minute.

8. An apparatus for curing tires as set forth in claim 1, wherein said pump is rated to circulate heated water at a rate of about 15 to 40 gallons per minute.

9. An apparatus for curing tires, comprising:
   a chamber configured for containing at least one tire assembly for curing;
   a heat exchanger in thermal communication with said chamber;
   a heating unit for heating water, said heating unit being in fluid communication with said heat exchanger;
   a pump for circulating a flow of water between said heating unit and said heat exchanger;
   an expansion tank in fluid communication with said heating unit and said pump such that water may circulate from said heating unit to said expansion tank and said heat exchanger, and back to said pump;
   a pressure sensor in fluid communication with the water; and
   a valve connected fluidly between said heating unit and said expansion tank, said valve configured for selectively diverting at least part of the flow between said heating unit and said heat exchanger to said expansion tank based on pressure readings determined by said pressure sensor.

10. An apparatus for curing tires as in claim 9, further comprising a control system in communication with said pressure sensor and said valve, said control system configured for opening said valve for a predetermined period of time when the pressure of water is below a desired set-point pressure and configured for closing said valve when the pressure of water rises above the desired set-point pressure.

11. An apparatus for curing tires as set forth in claim 10, further comprising a temperature sensor positioned for measuring water temperature at a predetermined position that is upstream of said heating unit and downstream from said heat exchanger.

12. An apparatus for curing tires as set forth in claim 11, wherein said control system is in communication with said temperature sensor and said heating unit and is configured for operating said heating unit based on temperature measurements of said temperature sensor.

13. An apparatus for curing tires as set forth in claim 12, wherein said heat exchanger is a multi-pass fin and tube assembly.

14. An apparatus for curing tires as set forth in claim 12, wherein said heat exchanger is a steam plate assembly.

15. An apparatus for curing tires as set forth in claim 12, wherein said chamber is a tire curing press and said heat exchanger further comprises a bladder disposable in an interior of a tire cavity and a circuit for guiding the flow of water through portions of said curing press surrounding an exterior of the tire.

16. An apparatus for curing tires as set forth in claim 11, further comprising a fan for circulating air in said chamber at a rate of about 1500 to 1800 feet per minute.

17. An apparatus for curing tires as set forth in claim 11, wherein said pump is rated to circulate heated water at a rate of about 15 to 40 gallons per minute.

18. A method for curing tire assemblies, comprising the steps of:
   placing a plurality of tire assemblies in a chamber;
   heating water to a desired set-point temperature using a heating unit;
   circulating the heated water in a closed circuit through a heat exchanger in the chamber;
   circulating air in the chamber to flow by the heat exchanger;
   measuring the pressure of the heated water;
   comparing the measured pressure to a desired set-point pressure;
   opening a control valve to divert the water to an expansion tank if the measured pressure is below the desired set-point pressure; and closing the control valve to prevent water from flowing to the expansion tank if the measured pressure is above the desired set-point pressure.

19. A method for curing tire assemblies as set forth in claim 18, further comprising the steps of:
    measuring the temperature of the heated water at a predetermined position that is after the water passes through the heat exchanger and before the water passes through the heating unit;
    comparing the measured temperature to a desired set-point temperature; and
    modifying the operation of the heating unit depending upon the results of said comparing step.

20. A method for curing tire assemblies as set forth in claim 19, wherein the water is heated to a temperature of about 120° C. to 190° C.

21. A method for curing tire assemblies as set forth in claim 20, wherein air is circulated at a rate of at least 1000 feet per minute.

22. A method for curing tire assemblies as set forth in claim 21, wherein air is circulated at a rate of about 1500 to 1800 feet per minute.

23. A method for curing tire assemblies as set forth in claim 22, wherein the heated water is circulated at a rate of about 15 to 40 gallons per minute.

24. A method for curing tire assemblies, comprising the steps of:
    placing a plurality of tire assemblies in a chamber;
    heating water to a desired set-point temperature using a heating unit;
    circulating the heated water in a closed circuit through a heat exchanger in the chamber;
    circulating air in the chamber to flow by the heat exchanger;
    measuring the pressure of the heated water;
    comparing the measured pressure to a desired set-point pressure range;
    opening a control valve to divert the water to an expansion tank if the measured pressure is below the desired set-point pressure range; and
    closing the control valve to prevent water from flowing to the expansion tank if the measured pressure is above the desired set-point pressure range.

25. A method for curing tire assemblies as set forth in claim 24, further comprising the steps of:
    measuring the temperature of the heated water at a predetermined position that is after the water passes through the heat exchanger and before the water passes through the heating unit;
    comparing the measured temperature to a desired set-point temperature; and
    modifying the operation of the heating unit depending upon the results of said comparing step.

* * * * *